United States Patent
Yamada

(10) Patent No.: US 8,638,423 B2
(45) Date of Patent: Jan. 28, 2014

(54) RANGE FINDER

(75) Inventor: Kenji Yamada, Yachiyo (JP)

(73) Assignee: Nikon Vision Co., Ltd., Tokyo (JP)

( * ) Notice: Subject to any disclaimer, the term of this patent is extended or adjusted under 35 U.S.C. 154(b) by 125 days.

(21) Appl. No.: 13/287,571

(22) Filed: Nov. 2, 2011

(65) Prior Publication Data

US 2012/0113409 A1 May 10, 2012

Related U.S. Application Data

(63) Continuation-in-part of application No. 12/813,006, filed on Jun. 10, 2010, now Pat. No. 8,477,290.

(30) Foreign Application Priority Data

| Jun. 22, 2009 | (JP) | 2009-147299 |
| Jan. 18, 2010 | (JP) | 2010-007799 |
| Nov. 4, 2010 | (JP) | 2010-247346 |

(51) Int. Cl.
*G01C 3/08* (2006.01)

(52) U.S. Cl.
USPC ......... 356/4.05; 356/3.01; 356/3.1; 356/4.01; 356/4.1

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,936,736 A * | 8/1999 | Suzuki et al. ................. 356/624 |
| 6,441,887 B1 | 8/2002 | Kao |
| 6,573,981 B2 | 6/2003 | Kumagai et al. |
| 6,894,767 B2 | 5/2005 | Ishinabe et al. |
| 7,193,792 B2 | 3/2007 | Bernhard et al. |
| 2002/0008865 A1 | 1/2002 | Shirai et al. |
| 2005/0179888 A1 | 8/2005 | Kallio |
| 2005/0275825 A1 | 12/2005 | Ohtomo et al. |

FOREIGN PATENT DOCUMENTS

| EP | 1 607 766 A1 | 12/2005 |
| JP | A-49-032654 | 3/1974 |
| JP | A-61-255302 | 11/1986 |
| JP | A-62-052477 | 3/1987 |

(Continued)

OTHER PUBLICATIONS

Japanese Office Action in Japanese Patent Application No. 2010-007799; dated Oct. 17, 2011 (with English-language translation).

(Continued)

*Primary Examiner* — Luke Ratcliffe
(74) *Attorney, Agent, or Firm* — Oliff & Berridge, PLC

(57) ABSTRACT

A laser range finder includes: a light source emitting light from a linear light-emitting portion with making a divergent angle of the light larger in a transversal direction of the light-emitting portion than in a longitudinal direction thereof; an objective lens projecting the light onto a target object and converging reflection light; a partial reflection member disposed between the light source and the objective lens and having a partial reflection surface composed of a transmitting area transmitting light emitted from the light source and receiving areas reflecting reflection light; and a photodetector detecting the reflection light reflected by the receiving areas; wherein the light source and the partial reflection member are disposed with making the longitudinal direction of the light-emitting portion disposed substantially perpendicular to a longitudinal direction of the transmitting area as seen along an optical axis.

8 Claims, 8 Drawing Sheets

(56) References Cited

FOREIGN PATENT DOCUMENTS

| | | |
|---|---|---|
| JP | A-63-244001 | 10/1988 |
| JP | A-08-094739 | 4/1996 |
| JP | A-10-301216 | 11/1998 |
| JP | A-2001-304838 | 10/2001 |
| JP | A-2002-202369 | 7/2002 |
| JP | A-2002-350543 | 12/2002 |
| JP | A-2004-069611 | 3/2004 |
| JP | A-2005-189231 | 7/2005 |
| JP | A-2006-003098 | 1/2006 |
| JP | A-2006-053055 | 2/2006 |
| JP | A-2008-039600 | 2/2008 |
| JP | A-2001-050742 | 2/2011 |

OTHER PUBLICATIONS

Oct. 19, 2012 Office Action issued in Japanese Patent Application No. 2010-247346 (with translation).

Apr. 8, 2013 Office Action issued in U.S. Appl. No. 13/729,925.

Jul. 2, 2013 Office Action issued in Japanese Patent Application No. 2010-247346 (with translation).

* cited by examiner

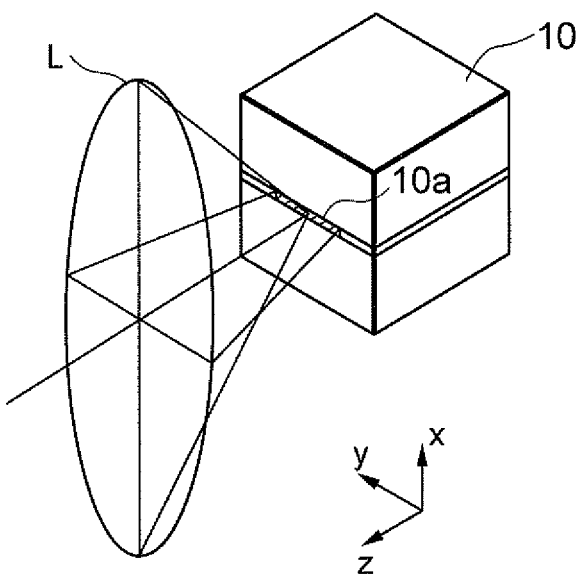
FIG. 2A
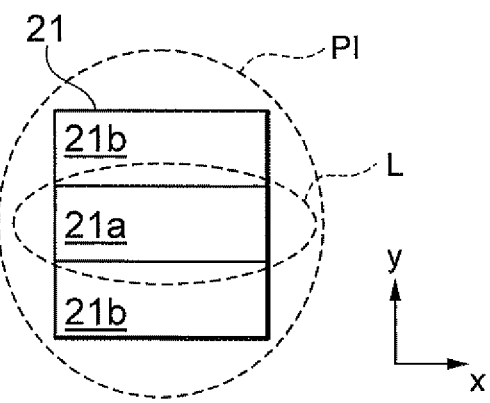
FIG. 2B
FIG. 2C
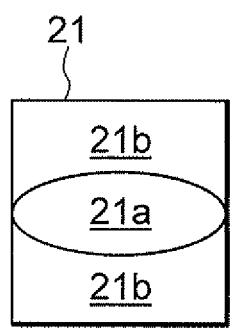
FIG. 2D
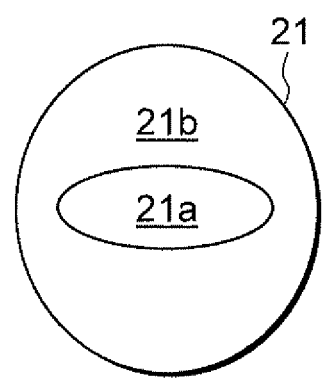

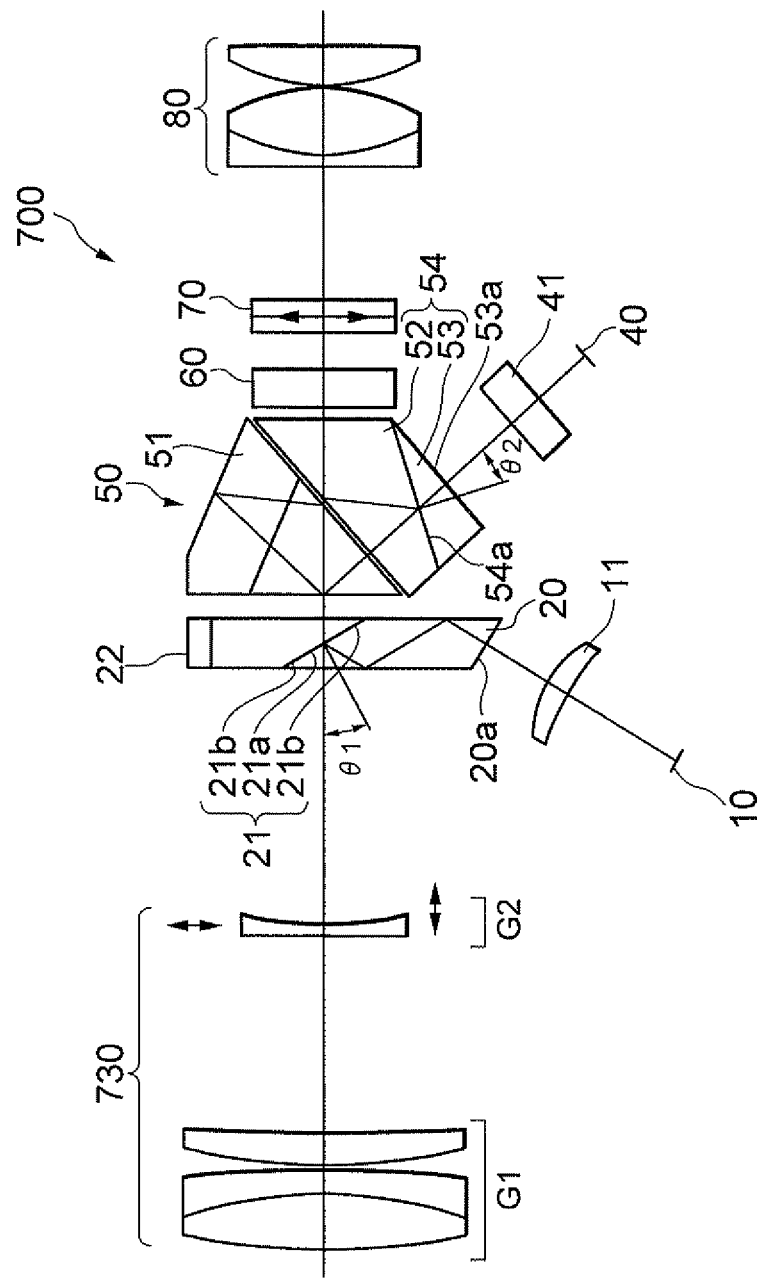

RANGE FINDER

This is a Continuation-in-Part of U.S. application Ser. No. 12/813,006 filed Jun. 10, 2010 now U.S. Pat. No. 8,477,290. The disclosure of the prior application is hereby incorporated by reference herein in its entirety.

The disclosure of the following priority applications are herein incorporated by reference:

Japanese Patent Application No. 2009-147299 filed on Jun. 22, 2009,

Japanese Patent Application No. 2010-007799 filed on Jan. 18, 2010, and

Japanese Patent Application No. 2010-247346 filed on Nov. 4, 2010

BACKGROUND OF THE INVENTION

1. Field of the Invention

The present invention relates to a distance measuring apparatus, or range finder.

2. Related Background Art

As a conventional distance measuring apparatus or range finder, there has been proposed a one that disposes a transmitting optical system and a receiving optical system completely independently (for example, see Japanese Patent Application Laid-Open No. 2002-350543).

However, the conventional laser range finder that makes the transmitting optical system and the receiving optical system completely independent has been disadvantageous for making it compact.

Although it has been technically possible to make it compact by making the transmitting optical system and the receiving optical system common, sufficient measurement light amount has not been secured and it has been difficult to make the measuring distance longer.

Moreover, with configuring the distance measuring apparatus or range finder as described above, since the transmitting optical path and the receiving optical path are disposed close together, a portion of light emitted from the light source is mixed into the optical path of the receiving optical system inside of the range finder to produce noise, so that S/N ratio becomes lowered and distance measurement accuracy becomes lowered.

SUMMARY OF THE INVENTION

The present invention is made in view of the above-described problem, and has an object to provide a distance measuring apparatus or range finder capable of accomplishing compactness, a longer measuring distance and higher measuring accuracy with respect to a conventional one.

According to a first aspect of the present invention, there is provided a distance measuring apparatus comprising: a light source that emits light from a light-emitting portion having a linear shape with making a divergent angle of the light larger in a transversal direction of the light-emitting portion than in a longitudinal direction of the light-emitting portion; an objective lens that projects the light onto a target object and converges reflection light reflected from the target object; a partial reflection member that is disposed between the light source and the objective lens and has a partial reflection surface composed of a transmitting area transmitting light emitted from the light source and a receiving area reflecting reflection light reflected from the target object and converged by the objective lens; and a photodetector that detects the reflection light reflected by the receiving area of the partial reflection surface; wherein the light source and the partial reflection member are disposed with making the longitudinal direction of the light-emitting portion disposed substantially perpendicular to a longitudinal direction of the transmitting area as seen along an optical axis.

According to the second aspect of the present invention, there is provided a distance measuring apparatus comprising: a light source that emits light from a light-emitting portion having a linear shape with making a divergent angle of the light larger in a transversal direction of the light-emitting portion than in a longitudinal direction of the light-emitting portion; an objective lens that projects the light onto a target object and converges reflection light reflected from the target object; a partial reflection member that is disposed between the light source and the objective lens and has a partial reflection surface composed of a transmitting area reflecting light emitted from the light source and a receiving area transmitting reflection light reflected from the target object and converged by the objective lens; and a photodetector that detects the reflection light transmitted by the receiving area of the partial reflection surface; wherein the light source and the partial reflection member are disposed with making the longitudinal direction of the light-emitting portion disposed substantially perpendicular to a longitudinal direction of the transmitting area as seen along an optical axis.

In a first or second aspect of the present invention, the distance measuring apparatus includes, a wavelength separation member having a wavelength separation surface that is disposed between the objective lens and the partial reflection member, transmits the light, and reflects visible light; and an eyepiece that is for observing a primary image of the target object formed by means of the objective lens with the visible light reflected by the wavelength separation surface.

In a first or second aspect of the present invention, it is preferable that at least a portion of the objective lens is moved in a direction having a component perpendicular to the optical axis.

In a first or second aspect of the present invention, it is preferable that at least a portion of the objective lens is moved along the optical axis upon focusing.

According to a third aspect of the present invention, there is provided a distance measuring apparatus comprising: a collimating optical system composed of, in order from a target object side, an objective lens, a partial reflection member and an erecting prism; a first-optical-path-diverging surface that is disposed in the partial reflection member and diverges a first measurement optical path from an optical path of the collimating optical system; a second-optical-path-diverging surface that is one reflection surface of the erecting prism and diverges a second measurement optical path from the optical path of the collimating optical system; a light source that is disposed on one of the first measurement optical path or the second measurement optical path and emits light for projecting onto the target object; and a photodetector that is disposed on the other of the first measurement optical path or the second measurement optical path and detects light that is reflected from the target object and converged by the objective lens; and the following conditional expression (1) being satisfied:

$$0.05 \leq (\Sigma(di/ni))/f \leq 0.5 \quad (1)$$

where di denotes a distance along the optical axis from each optical surface that includes the first-optical-path-diverging surface and is disposed between the first-optical-path-diverging surface and the second-optical-path-diverging surface to the image side next optical surface, ni denotes a refractive index of the medium disposed image side of each optical surface, and f denotes a focal length of the objective lens.

In the third aspect of the present invention, it is preferable that the first-optical-path-diverging surface includes a reflecting area that reflects the light and transmits visible light and a transmitting area that transmits visible light and the light.

In the third aspect of the present invention, it is preferable that the second-optical-path-diverging surface transmits the light and reflects visible light.

In the third aspect of the present invention, it is preferable that the following conditional expression (2) is satisfied:

$$20° \leq \theta_1 \leq 40° \quad (2)$$

where $\theta_1$ denotes an angle of incidence of the light incident on the first-optical-path-diverging surface.

In the third aspect of the present invention, it is preferable that the following conditional expression (3) is satisfied:

$$15° \leq \theta_2 \leq 40° \quad (3)$$

where $\theta_2$ denotes an angle of incidence of the light incident on the second-optical-path-diverging surface.

In the third aspect of the present invention, it is preferable that the collimating optical system includes an eyepiece that makes it possible to observe an image formed by the objective lens.

In the third aspect of the present invention, it is preferable that at least a portion of the objective lens is movable in a direction including a component perpendicular to the optical axis of the collimating optical system.

In the third aspect of the present invention, it is preferable that at least a portion of the objective lens is movable along the optical axis of the collimating optical system upon focusing.

With configuring the distance measuring apparatus or range finder as described above, it becomes possible to accomplish compactness, a longer measuring distance and higher measuring accuracy.

BRIEF DESCRIPTION OF THE DRAWINGS

FIGS. 2A, 2B, 2C and 2D are diagrams showing a relation between laser light emitted from a light source and a partial reflection surface, in which FIG. 2A shows diversion of the light flux emitted from the light source, FIG. 2B shows a relation between a pupil of an objective lens and the light flux emitted from the light source on the partial reflection surface, and FIGS. 2C and 2D show variations of the partial reflection surface.

FIG. 8 is a diagram showing a configuration of a laser range finder according to a seventh embodiment.

DESCRIPTION OF THE MOST PREFERRED EMBODIMENT

First Embodiment

Figure 1:
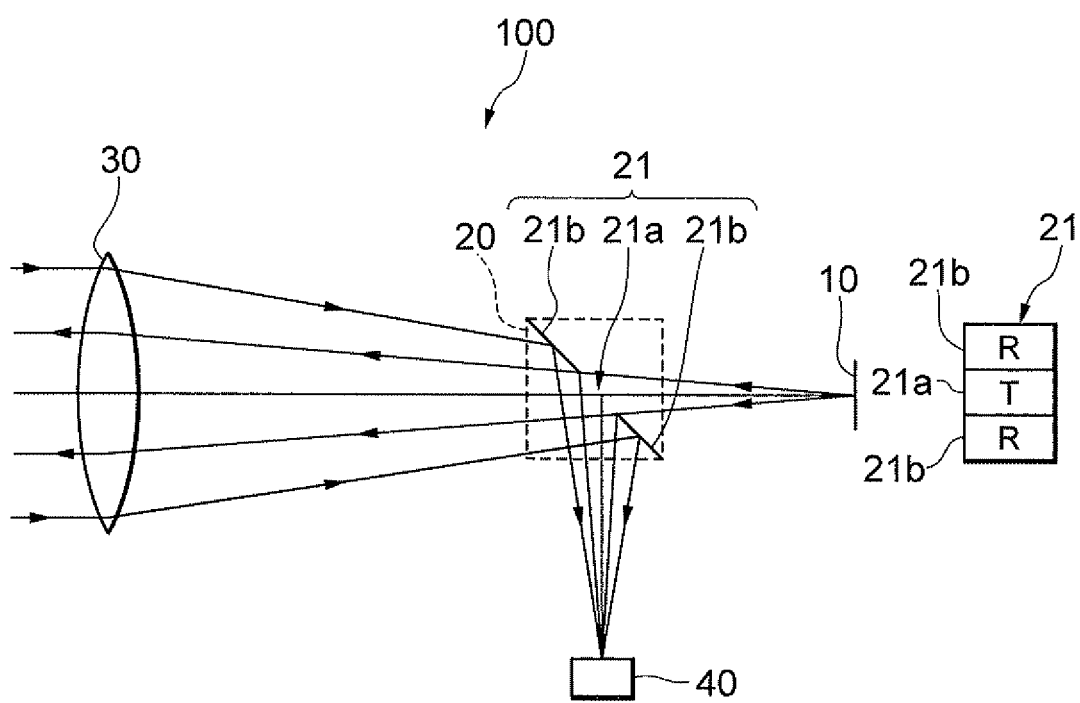
FIG. 1 is a diagram showing a configuration of a laser range finder according to a first embodiment.

Preferred embodiments according to the present invention are explained below with reference to accompanying drawings. A configuration of a laser range finder 100 as a distance measuring apparatus according to the first embodiment is explained with reference to FIG. 1. The laser range finder 100 is composed of a light source 10 that is a semiconductor laser, a partial reflection member 20, an objective lens 30, and a photodetector 40. The light source 10 is disposed on the focal point of the objective lens 30 or in the vicinity thereof. The partial reflection member 20 has a partial reflection surface 21 inclined with respect to an optical axis and is disposed between the light source 10 and the objective lens 30. The partial reflection surface 21 is divided into three areas, and composed of a transmitting area 21a disposed with including the optical axis and having a substantially rectangular shape, and two receiving areas 21b disposed above and below of the transmitting area, each having a substantially rectangular shape. In the first embodiment, the transmitting area 21a is constructed as a light transmission surface (T) that transmits light emitted from the light source 10, and the receiving areas 21b are constructed as light reflection surfaces (R) that reflect light incident from the objective lens 30 side. The photodetector 40 is disposed at a position (on the focal point of the objective lens 30 or in the vicinity thereof) where light reflected by the receiving areas 21b converges.

In the laser range finder 100 having such a construction, laser light emitted in pulses from the light source 10 (hereinafter called as measurement light, too) is transmitted through the transmitting area 21a formed at substantially the center of the partial reflection surface 21, incident on the objective lens 30, transformed into substantially parallel light by the objective lens 30, and projected on an unillustrated target object. A portion of measurement light reflected and dispersed by the target object (hereinafter called as reflection light, too) is incident on the objective lens 30 to be converged, reflected by the receiving areas 21b formed on the partial reflection surface 21, and converged on the photodetector 40. Accordingly, electrical signals output from the photodetector 40 in response to detected reflection light are processed by an unillustrated distance calculation portion. With measuring time from emitting measurement light to receiving reflection light and by using the time and velocity of light, the distance between the laser range finder 100 and the target object can be calculated. In this manner, when transmitting measurement light and receiving reflection light are carried out by the common partial reflection member 20 and the common objective lens 30, the laser range finder 100 can be made compact.

A light-emitting portion 10a of the light source 10 emitting such measurement light (laser light) is very small, but is not a point in a precise sense, and forms a linear area having a length and a width. The length ranges from several times to several dozen times of the width, and it depends on the kind of semiconductor laser. The length may become several hundred times of the width in a case of a high output one in particular. As described above, since the light-emitting portion 10a is not a point, but near to a line, a sectional shape (far field image) of the bundle of rays L of the laser light emitted from the light-emitting portion 10a becomes an elliptical shape whose minor axis is the length direction of the light-emitting portion 10a and major axis is the width direction thereof. When it is assumed that the normal direction of the light-emitting portion 10a (a direction that laser light is emitted, and a direction of the optical axis of the laser range finder 100) is z-axis, the width direction is x-axis, and the length direction is y-axis, laser light (measurement light) emitted from the light source 10 passes through an elliptical area extending wide in x-axis direction from the center (optical axis) to the periphery and narrow in y-axis direction near the center (optical axis) within the pupil PI of the objective lens 30 as shown in FIG. 2B.

In order to make the measurement distance of the laser range finder 100 long, using efficiency of the laser light emitted from the light source 10 is necessary to be high. Accordingly, in the laser range finder 100 according to the first embodiment, the transmitting area 21a and the receiving areas 21b of the partial reflection surface 21 are formed in a substantially rectangular shapes and disposed and arranged in y-axis direction such that as seen along the optical axis (z-axis), a longitudinal direction of the transmitting area 21a composing the partial reflection surface 21 with respect to the light source 10 is made substantially perpendicular to the longitudinal direction of the light-emitting portion 10a of the light source 10 (the major axis direction of the bundle of rays L having an elliptical shape is substantially coincident with the longitudinal direction of the transmitting area 21a having a substantially rectangular shape) as shown in FIG. 2B. With disposing the light source 10 (the light-emitting portion 10a) and the partial reflection surface 21 (the transmitting area 21a and the receiving areas 21b) this way, emitted light amount can be most effectively secured with respect to the light emitting area of the laser light having elliptical section, so that measurement distance can be expanded. Laser light (reflection light) reflected from the target object and incident on the objective lens 30 can be received by the receiving areas 21b disposed at the areas where measurement light from the light source 10 does not pass (peripheral area in y-axis direction disposed in line symmetry with respect to x-axis), and led to the photodetector 40, so that sufficient areas can be secured with respect to the reflection light.

Second Embodiment

Figure 3:
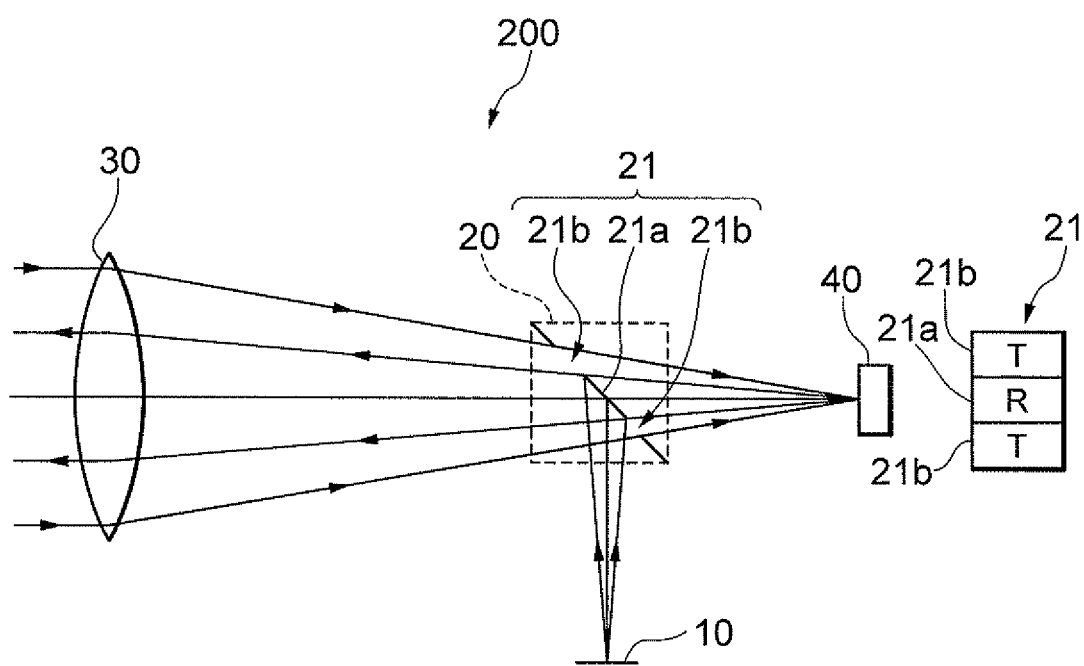
FIG. 3 is a diagram showing a configuration of a laser range finder according to a second embodiment.

As seen in a laser range finder 200 as a distance measuring apparatus according to a'second embodiment shown in FIG. 3, a partial reflection surface 21 formed on a partial reflection member 20 may be constructed by making a transmitting area 21a as a light reflection surface (R), and two receiving areas 21b as light transmission surfaces (T). In this case, measurement light emitted from a light source 10 is reflected by the transmitting area 21a formed at the center of the partial reflection surface 21, incident on an objective lens 30, transformed into substantially parallel light by the objective lens 30, and projected to an unillustrated target object. A portion of reflection light reflected and dispersed by the target object is incident on the objective lens 30, and converged by the objective lens 30 to form an image on a photodetector 40 through receiving areas 21b formed on the partial reflection surface 21. In such construction also, arrangement of the light source 10 (the light-emitting portion 10a) and the partial reflection surface 21 (the transmitting area 21a and receiving areas 21b) is the same as described above.

In the laser range finders 100 and 200 according to the first and the second embodiments, respectively, although it is described that each of the transmitting area 21a and receiving areas 21b of the partial reflection surface 21 is formed in a substantially rectangular shape, the shape is not limited to this. For example, as shown in FIG. 2C, with respect to the partial reflection surface 21 having a substantially rectangular shape, the transmitting area 21a may be made to be an elliptical shape and the other portions may be made to be receiving areas 21b or as shown in FIG. 2D, the transmitting area 21a having an elliptical shape may be formed at substantially the center of the partial reflection surface 21 having a circular shape, and the other portions may be made to be receiving areas 21b. As described above, in each case, the major axis (longitudinal direction) of the transmitting area 21a is disposed at substantially right angles to the longitudinal direction of the light-emitting portion 10a.

Third Embodiment

Figure 4:
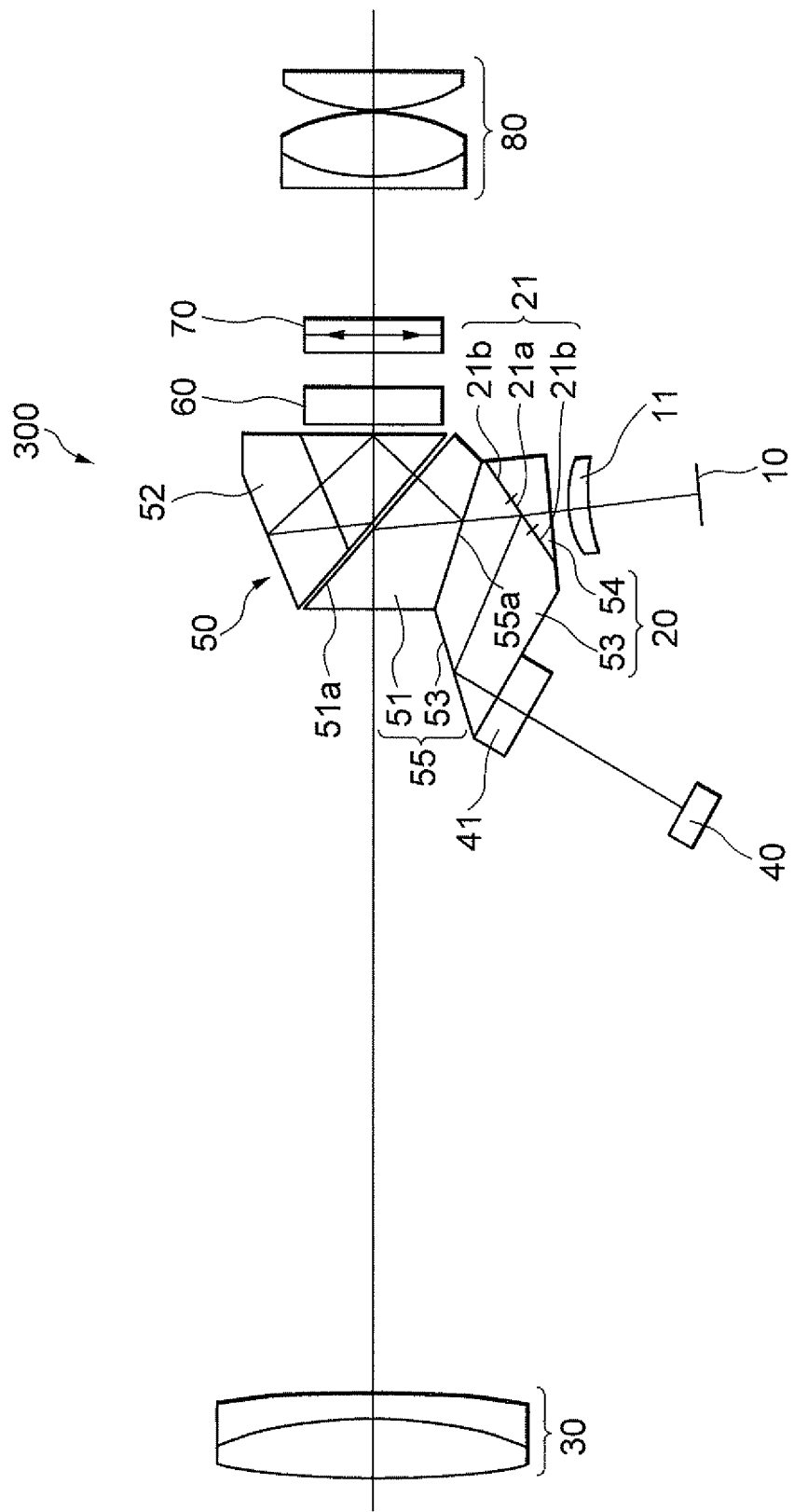
FIG. 4 is a diagram showing a configuration of a laser range finder according to a third embodiment.

Then, a laser range finder 300 as a distance measuring apparatus according to a third embodiment, which has the laser range finder 100 according to the first embodiment as a fundamental construction, is explained with reference to FIG. 4. The laser range finder 300 includes, in order from an object side, an objective lens 30, a prism member 50, a protection filter 60, a liquid crystal display 70, and an eyepiece 80. On optical paths separated by the prism member 50, a partial reflection surface 21, a condenser lens 11, a light source 10, a background-light-blocking filter 41, and a photodetector 40 are disposed. The prism member 50 is composed of a first prism 51 and a second prism 52 composing an erecting prism that converts an inverted image of the object (target object) formed by the objective lens 30 into an erect image, a third prism 53 that is cemented with the first prism 51 and forms a wavelength-separation surface 55a on the cemented surface therebetween that separates light by reflecting visible light for observing the object and transmitting measurement light (laser light), and a fourth prism 54 that is cemented with the third prism 53 and forms the above-described partial reflection surface 21 on the cemented surface therebetween. In this manner, a dichroic prism 55, which is a wavelength separation member, is composed of the first prism 51 and the third prism 53. The third prism 53 and the fourth prism 54 compose the above-described partial reflection member 20, and, for example, a reflection layer made of aluminum is deposited on each receiving area 21b, which is a light reflection surface.

In the laser range finder 300 having such construction, light (visible light) emitted from the object (target object) is converged by the objective lens 30, incident on the first prism 51, reflected by a reflection surface 51a and the wavelength-separation surface 55a of the first prism 51, and incident on the second prism 52. Then, the light is reflected three times (strictly speaking, four times) in the second prism 52, passes through the protection filter 60, and forms an image as a primary image (erected image) of the object. The liquid crystal display 70 is disposed at substantially the same position as the position the primary image is formed, so that a measurer can observe enlarged primary image of the object together with an image displayed on the liquid crystal display 70 in a superposing manner through an eyepiece 80. In other words, the measurer can collimate the target object by means of a telescopic optical system composed of the objective lens 30, the erecting prism (the first and second prisms) 51 and 52, the protection filter 60, the liquid crystal display 70 and the eyepiece 80.

On the other hand, measurement light (laser light) emitted from the light source 10 is converged by the condenser lens 11, incident on the fourth prism 54, passes through the transmitting area 21a of the partial reflection surface 21, incident on the third prism 53, and incident on the wavelength-separation surface 55a. As described above, since the wavelength-separation surface 55a transmits the laser light, the measurement light transmitted through the wavelength-separation surface 55a, is incident on the first prism 51, reflected by a first reflection surface 51a, exits the first prism 51, made to be substantially parallel light by the objective lens 30, and projected onto the target object. A portion of the measurement light (reflection light) reflected and dispersed by the target object is incident on the objective lens 30 to be converged, incident on the first prism 51, reflected by the first reflection surface 51a, passed through the wavelength-separation surface 55a, and incident on the third prism 53. After being reflected by the receiving areas 21b of the partial reflection member 20, the reflection light is reflected once by the third prism 53, passes through the background-light-blocking filter 41, and forms an image on the photodetector 40. Since light other than measurement light is included in such reflection light (measurement light reflected by the target object), the reflection light becomes noise upon detected by the photodetector 40, and S/N ratio is decreased by the noise. Accordingly, S/N ratio is increased by blocking light other than measurement light by using the background-light-blocking filter 41. Moreover, although reflection light (laser light) is separated from visible light by the wavelength-separation surface 55a as described above, in order to prevent remained laser light not separated by the wavelength-separation surface 55a from reaching the measurer's eye, the laser light is removed by the protection filter 60.

With constructing the laser range finder 300 as described above, since the measurer can project measurement light to the target object with collimating the target object through the eyepiece lens 80, the distance to the target object can be measured with correctly capturing the target object. Moreover, with displaying measured distance as an image on the liquid crystal display 70, the distance is displayed in the observation field of the measurer, so that the measurer can confirm the target object together with the distance thereto.

Fourth Embodiment

In the hand-held laser range finder 300 according to the third embodiment, since the image of the target object to be collimated blurs by a movement of the hands, there has been a problem that the measurement position is difficult to be set. Then, a laser range finder 400 as a distance measuring apparatus according to a fourth embodiment capable of suppressing image blur by means of moving at least a portion of the objective lens as a vibration reduction lens in a direction having a component perpendicular to the optical axis is explained. Incidentally, the same component as the laser range finder 300 according to the third embodiment is attached to the same reference symbol to eliminate detailed explanations.

Figure 5:
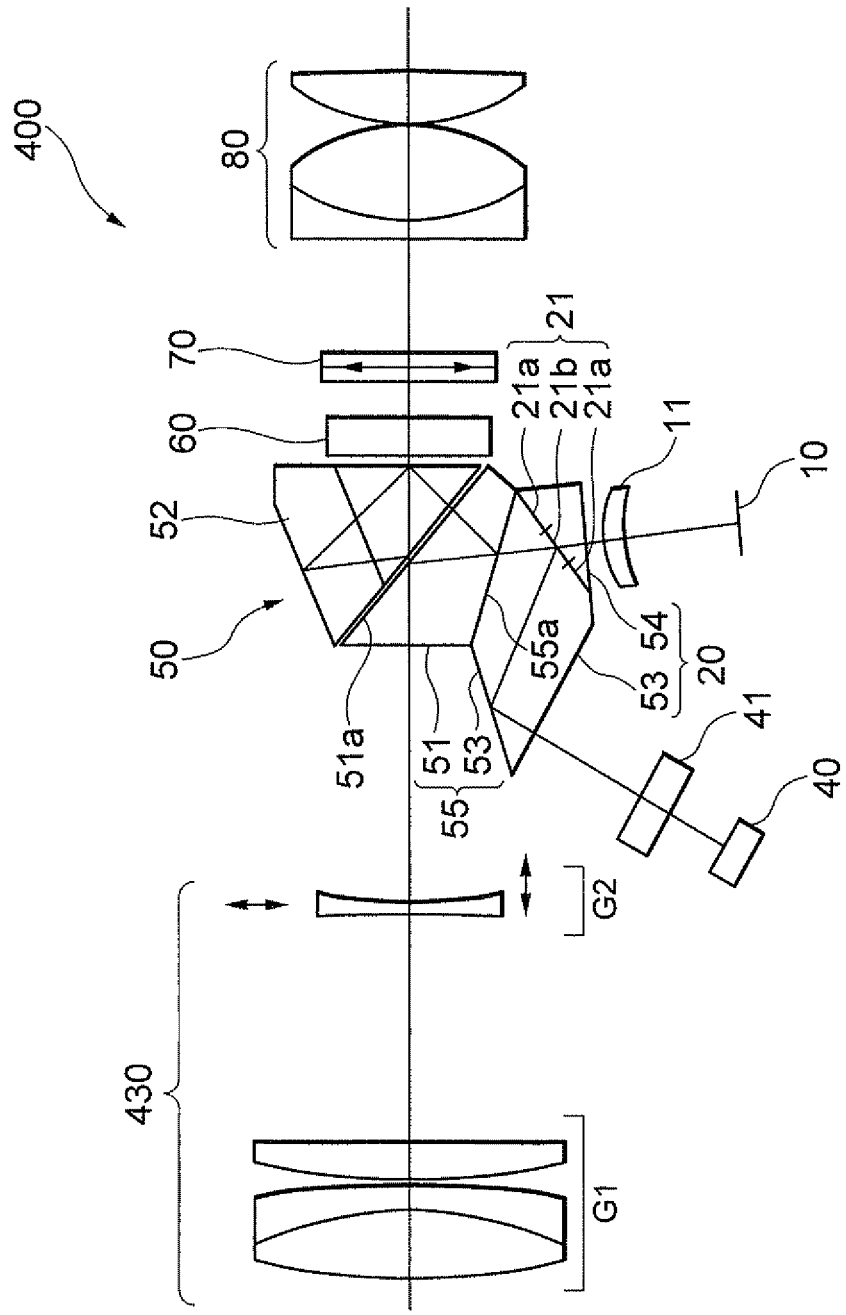
FIG. 5 is a diagram showing a configuration of a laser range finder according to a fourth embodiment.

The laser range finder 400 shown in FIG. 5 is a one, in which the objective lens 30 of the laser range finder 300 according to the third embodiment is replaced by an optical system suitable for carrying out vibration reduction (objective lens 430). In other words, the objective lens 430 is composed of, in order from an object side, a first lens group G1 having positive refractive power, and a second lens group G2 having negative refractive power, and vibration reduction is carried out by moving the second lens group G2 in a direction having a component perpendicular to the optical axis. With putting the first lens group G1 disposed to the object side in possession of positive refractive power, the first lens group G1 can narrow the bundle of rays, so that the diameter of the second lens group G2 can be made small. Accordingly, the second lens group G2 becomes easy to be moved for vibration reduction. In this instance, with providing a gyro-sensor (angular velocity sensor) for detecting a movement of hands, the vibration reduction lens is moved in a direction canceling the detected movement.

Moreover, in the laser range finder 400 having such a construction, upon measuring a distance to a short-range object, with moving at least a portion of the objective lens 430 as a focusing lens along the optical axis, the short-range object is focused, so that the image of the object can be observed clearly. In the laser range finder 400 shown in FIG. 5, the second lens group G2 is made to be the focusing lens.

The whole of the objective lens 430 may be used as the vibration reduction lens and the focusing lens, or the objective lens 430 may be composed of three lens groups or more, and a portion thereof may be used as the vibration reduction lens or the focusing lens. In this case, vibration reduction and focusing may be carried out by different lens groups.

Moreover, in the laser range finder 300 according to the third embodiment, although the background-light-blocking filter 41 is cemented with the third prism 53, the background-light-blocking filter 41 may be disposed with separating from the third prism 53 such as in the laser range finder 400 according to the fourth embodiment.

Fifth Embodiment

Then, a laser range finder 500 according to a fifth embodiment, which uses the above-described laser range finder 200 as a fundamental construction and is capable of measuring a distance with collimating a target object through an objective lens 30, is explained with reference to FIG. 6. The laser range finder 500 includes, in order from an object side, an objective lens 30, a partial reflection member 20, a prism member 50, a protection filter 60, a liquid crystal display 70, and an eyepiece 80. On a first measurement optical path diverged by a partial reflection surface 21 of the partial reflection member 20, a condenser lens 11 and a light source 10 are disposed. Incidentally, a transmitting area 21a of the partial reflection surface 21 is a dichroic mirror that reflects laser light, which is measurement light and also infrared light, and transmits visible light. In other words, the partial reflection member 20 has a configuration of a dichroic prism.

Measurement light emitted from the light source 10 is converged by the condenser lens 11 and incident on an incident surface 20a of the partial reflection member 20. Then, the light is made total internal reflection two times in the partial reflection member 20 and led to a transmitting area 21a on the partial reflection surface 21. Incidentally, an angle of the partial reflection member 21 with respect to the optical axis and the position of the light source 10 are adjusted such a manner that measurement light emitted by the light source 10 incident on the transmitting area 21a on the partial reflection surface 21 is reflected along the optical axis of the objective lens 30. Measurement light reflected by the transmitting area 21a on the partial reflection surface 21 is transformed into substantially parallel light by the objective lens 30 and projected to the target object.

Incidentally, the incident surface 20a of the partial reflection member 20 is constructed such that measurement light from the light source 10 is incident on the incident surface 20a substantially perpendicularly. Moreover, in order that measurement light emitted from the light source 10 and transmitted through the partial reflection surface 21 (which is measurement light transmitted through the transmitting area 21a or the receiving area 21b) may not be mixed into a receiving lens system, an infrared absorption filter 22 for absorbing measurement light is provided on the position where transmitted measurement light is incident.

On the other hand, a portion of measurement light projected onto the target object is reflected and scattered by the target object, and a portion of the light is incident on the objective lens 30 as described above. Then, the measurement light is converged by the objective lens 30, incident on the partial reflection member 20, transmitted through the receiving area 21b on the partial reflection surface 21, and incident on the prism member 50. The prism member 50 is composed of a first prism 51 and a second prism 52 that comprise an erecting prism for converting a reversed image of the object (target object) formed by the objective lens 30 into an erected image, and a third prism 53 that is cemented with the second prism 52 such that a wavelength separation surface 54*a*, which is a second-optical-path-diverging surface for separating light by reflecting visible light for collimating the target object and transmitting measurement light (reflected light) which is laser light, is formed on the cemented surface. In this manner, a dichroic prism 54 is composed of the second prism 52 and the third prism 53. On a second measurement optical path diverged by the second-optical-path-diverging surface, which is the wavelength separation surface 54*a*, a background-light-blocking filter 41 and a photodetector 40 are provided.

Reflected light transmitted through the receiving area 21*b* on the partial reflection surface 21 of the partial reflection member 20 and incident on the first prism 51 of the prism member 50 is made total internal reflection three times (strictly speaking, four times) in the first prism 51, incident on the second prism 52, and incident on the wavelength separation surface 54*a* formed on the cemented surface of the second prism 52 and the third prism 53. As described above, since the wavelength separation surface 54*a* transmits laser light, reflected light is transmitted through the wavelength separation surface 54*a*, transmitted through an exit surface 53*a* of the third prism 53, transmitted through the background-light-blocking filter 41, and converged on the photodetector 40. Since such reflected light, in other words, measurement light reflected from the target object includes light other than measurement light, which becomes noise upon being detected by the photodetector 40 and decreases S/N ratio. Accordingly, with applying the background-light-blocking filter 41, S/N ratio is increased by blocking the light other than measurement light as much as possible. Moreover, the exit surface 53*a* of the third prism 53 is constructed such that reflected light is incident (or comes out) substantially perpendicularly to the exit surface 53*a*.

Moreover, in such a laser rang finder 500, visible light come out from the object (target object) is converged by the objective lens 30, transmitted through the partial reflection member 20, incident on the first prism 51, made total internal reflection three times (strictly speaking, four times) in the first prism 51, incident on the second prism 52, and incident on the wavelength separation surface 54*a*. Since the wavelength separation surface 54*a* reflects visible light as described above, visible light from the target object is reflected by the wavelength separation surface 54*a*, made total internal reflection once in the second prism 52, transmitted through the second prism 52, transmitted through the protection filter 60, and forms a primary image (erected image) of the object. At the substantially same position of the primary image, the liquid crystal display 70 is provided, so that a measurer can observe the primary image of the object and an image displayed on the liquid crystal display 70 in a superposing manner through the eyepiece 80. As described above, the measurer can collimate the target object by means of the collimating optical system composed of the objective lens 30, the erecting prisms (the first and second prisms) 51 and 52, the protection filter 60, the liquid crystal display 70 and the eyepiece 80.

Although reflected light, in other words, laser light can be separated from visible light by transmitting through the wavelength separation surface 54*a* as described above, in order to prevent remained laser light not separated by the wavelength-separation surface 54*a*, in other words, laser light reflected by the wavelength-separation surface 54*a* from reaching the measurer's eye, the laser light is removed by the protection filter 60.

Then, conditional expressions required for constructing such a laser range finder 500 are explained. In the laser range finder 500, the following conditional expression (1) is preferably satisfied:

$$0.05 \leq (\Sigma(d_i/n_i))/f \leq 0.5 \quad (1)$$

where di denotes a distance along an optical axis from each optical surface that includes the first-optical-path-diverging surface, which is the transmitting area 21*a* on the partial reflection surface 21, and is disposed between the first-optical-path-diverging surface and the second-optical-path-diverging surface, which is the wavelength separation surface 54*a*, to the image side next optical surface, ni denotes a refractive index of the medium disposed image side of each optical surface, and f denotes a focal length of the objective lens 30. Here, $\Sigma$ is a function for calculating (di/ni) at each optical surface i and deriving the summation thereof.

Conditional expression (1) is a condition for a handheld type, portable laser range finder 500 and for preventing distance measurement accuracy from being lowered caused by mixing a portion of measurement light emitted from the light source 10 into the receiving optical path in the laser range finder 500 generating noise to lower S/N ratio in reflection light detection. When the value $\Sigma$(di/ni) falls below the lower limit of conditional expression (1), the transmitting optical path becomes excessively closer to the receiving optical path, so that a portion of measurement light emitted from the light source 10 tends to be mixed into the receiving optical path within the laser range finder 500 to become noise resulting in lowering S/N ratio and distance measurement accuracy. On the other hand, when the value $\Sigma$(di/ni) exceeds the upper limit of conditional expression (1), the dimension of the laser range finder 500 becomes excessively large, so that it becomes difficult to be made sufficiently compact to be used as a handheld type.

Moreover, the laser range finder 500 preferably satisfies the following conditional expression (2):

$$20° \leq \theta_1 \leq 40° \quad (2)$$

where $\theta_1$ denotes an angle of incidence of the measurement light incident on and reflected from the transmitting area 21*a* on the partial reflection surface 21, in other words, the light ray propagating on the optical axis after emitted from the light source 10 and reflected from the first-optical-path-diverging surface.

Conditional expression (2) is for suitably constructing the first-optical-path-diverging surface. When the value $\theta_1$ falls below the lower limit of conditional expression (2), the partial reflection member 20, which is the dichroic prism, becomes excessively large in order to secure sufficient light amount of the measurement light required for measuring the distance, so that it becomes impossible to provide a compact laser rang finder 500. On the other hand, when the value $\theta_1$ exceeds the upper limit of conditional expression (2), it becomes difficult to form the partial reflection member 20, which is the dichroic prism on which the transmitting area 21*a* having sufficient characteristic for reflecting visible light and transmitting laser light (infrared light) is formed, with a relatively fewer number of layers.

Moreover, in the laser range finder 500, the following conditional expression (3) is preferably satisfied:

$$15° \leq \theta_2 \leq 40° \quad (3)$$

where $\theta_2$ denotes an angle of incidence of the reflected light ray, which is the light ray incident on the second-optical-pathdiverging surface propagated on the optical axis of the objective lens 30 among light rays reflected from the target object, incident on the second-optical-path-diverging surface.

Conditional expression (3) is for suitably constructing the second-optical-path-diverging surface. When the value θ2 falls below the lower limit of conditional expression (3), it becomes difficult to form the erecting prism effective for making compact the laser range finder 500 or to select the reflecting surface (the wavelength separation surface 54a) composing the dichroic prism 54 that reflects visible light and transmits laser light (infrared light). On the other hand, when the value θ2 exceeds the upper limit of conditional expression (3), it becomes difficult to form the dichroic prism 54 having sufficient characteristic for reflecting visible light and transmitting laser light (infrared light) with a relatively fewer number of layers:

Sixth Embodiment

Figure 6:
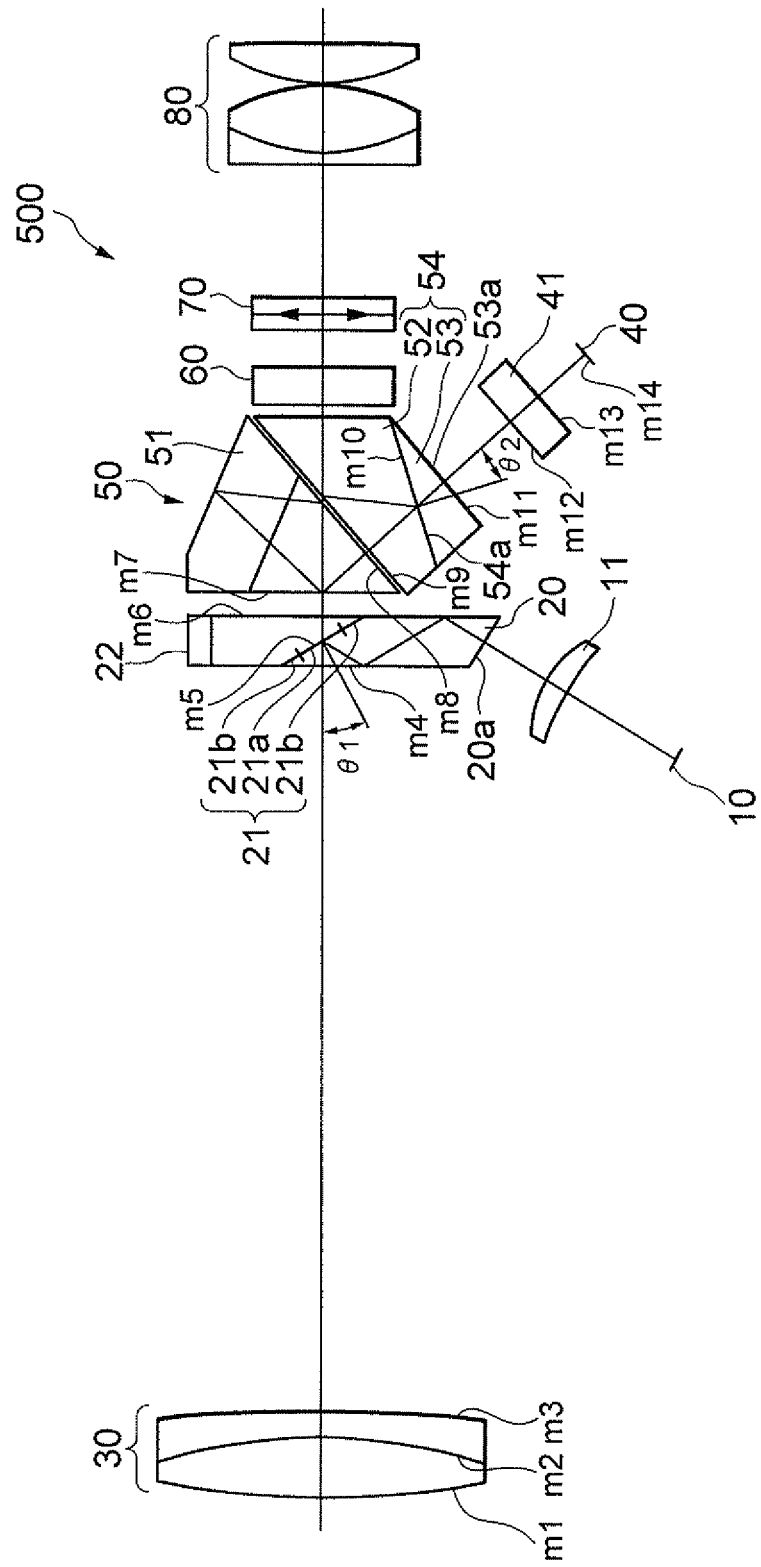
FIG. 6 is a diagram showing a configuration of a laser range finder according to a fifth embodiment.
Figure 7:
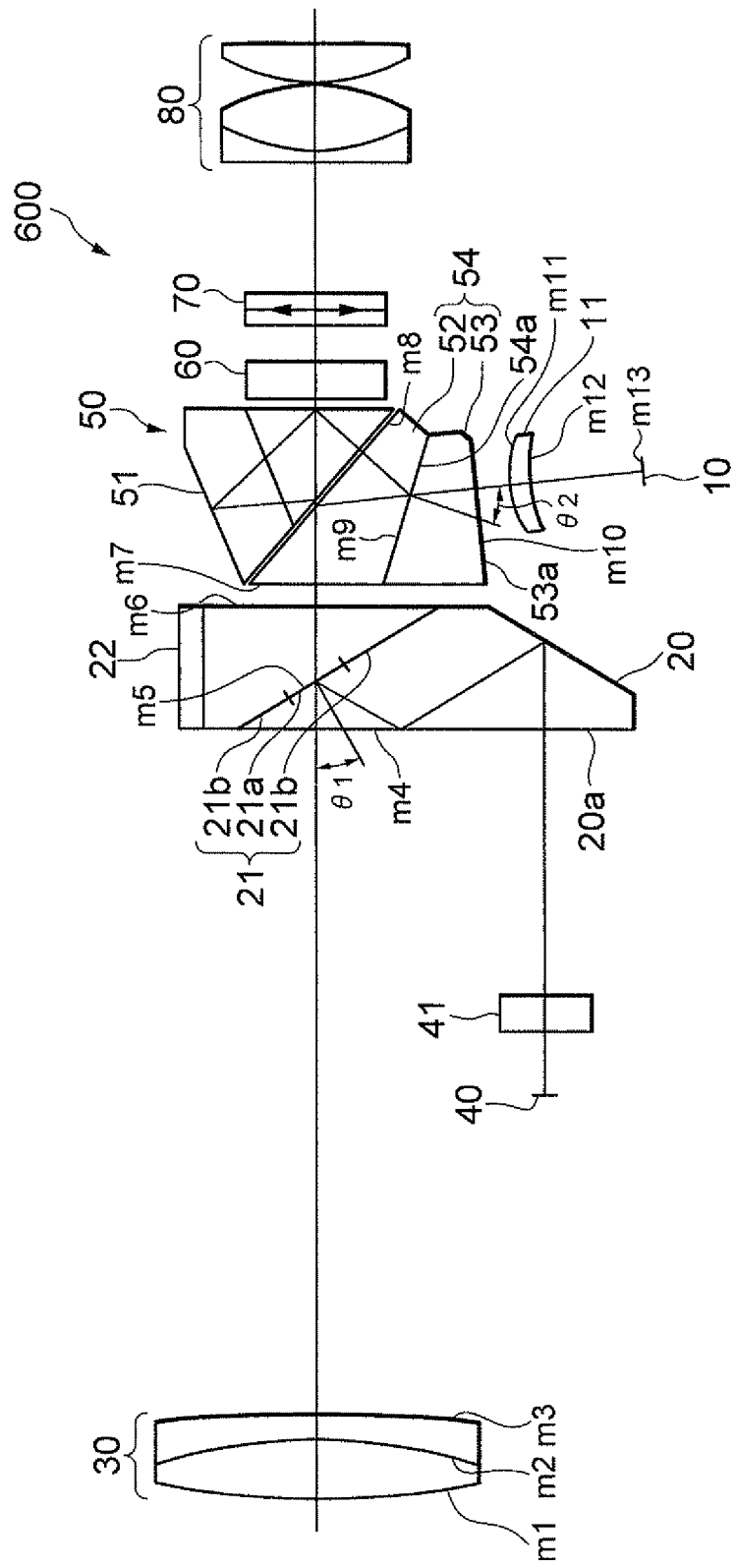
FIG. 7 is a diagram showing a configuration of a laser range finder according to a sixth embodiment.

Although in the laser range finder 500 shown in FIG. 6, a case that the measurement light is superposed on the optical axis of the objective lens 30 by the first-optical-path-diverging surface and separated to the photodetector 40 side by the second-optical-path-diverging surface is shown, the position of the light source 10 and the position of the photodetector 40 may be reversed as shown in FIG. 7, which uses the above-described laser range finder 100 shown in FIG. 1 as a fundamental construction. The construction of a laser range finder 600 shown in FIG. 7 is explained below. Incidentally, the same member shown in FIG. 6 is attached the same reference symbol, and detailed explanations are omitted.

In the laser range finder 600 shown in FIG. 7, a transmitting lens system is composed of, in order from a light source 10 side, a condenser lens 11, a prism member 50 in which the above-described wavelength separation surface 54a is formed, a partial reflection member 20 in which a partial reflection surface 21 is formed, and an objective lens 30. The receiving lens system is composed of, in order from the measurement object side, the objective lens 30 and the partial reflection member 20. Here, the receiving area 21b on the partial reflection surface 21 is composed of a dichroic mirror that reflects laser light, which is the above-described measurement light and infrared light, and transmits visible light. On the first measurement optical path diverged by the first-optical-path-diverging surface, which is the receiving area 21b composing the partial reflection surface 21 of the partial reflection member 20, a background-light-blocking filter 41 and a photodetector 40 are provided. On the second measurement optical path diverged by the second-optical-path-diverging surface, which is the wavelength separation surface 54a of the prism member 50, the condenser lens 11 and the light source 10 are provided. Moreover, in the example shown in FIG. 6, light (reflected light or visible light) converged by the objective lens 30 and transmitted through the partial reflection member 20 is incident on the first prism 51, the second prism 52, and the second-wavelength-diverging surface (wavelength separation surface 54a). However, in FIG. 7, visible light incident on the second prism 52 separated by the wavelength separation surface 54a is incident on the first prism 51.

In such a laser range finder 600, measurement light emitted from the light source 10 is converged by the condenser lens 11, incident on a third prism 53 from an incident surface 53a, and incident on the wavelength separation surface 54a, which is the second-optical-path-diverging surface. Since the wavelength separation surface 54a transmits laser light, measurement light is transmitted through the wavelength separation surface 54a, incident on the second prism 52 made total internal reflection once, and transmitted through the second prism 52. Then, measurement light is incident on the partial reflection member 20, and a portion of measurement light is transmitted through the transmitting area 21a on the partial reflection surface 21, which is the first-optical-path-diverging surface, is converted into substantially parallel light by the objective lens 30, and projected onto the measurement object. Incidentally, measurement light reflected from the partial reflection surface 21 is incident on an infrared absorbing filter 22 and absorbed thereby, so that measurement light is not mixed into the receiving lens system.

On the other hand, a portion of measurement light projected onto the measurement object is reflected and scattered by the measurement object, and incident again on the objective lens 30 to be converged. Reflected light converged by the objective lens 30 is incident on the partial reflection member 20, reflected by the receiving area 21b on the partial reflection surface 21, made total internal reflection two times in the partial reflection member 20, transmitted through an exit surface 20a, transmitted through the background-light-blocking filter 41, and forms an image on the photodetector 40. Moreover, light come out from the object (target object), which is visible light, is converged by the objective lens 30, transmitted through the partial reflection member 20, incident on the second prism 52, made total internal reflection once in the second prism 52, and incident on the wavelength separation surface 54a. Since the wavelength separation surface 54a reflects visible light, visible light is reflected by the wavelength separation surface 54a, incident on the first prism 51, made total internal reflection three times (strictly speaking, four times) in the first prism 51, and transmitted through the first prism 51. Then, the visible light is transmitted through the protection filter 60, and formed a primary image (erected image) of the object. At substantially the same position of the primary image, a liquid crystal display 70 is disposed, so that a measurer can observe enlarged primary image of the object together with an image displayed on the liquid crystal display 70 in a superposing manner through an eyepiece 80.

Moreover, in the laser range finder 600, reflected light transmitted through the partial reflection surface 21, in other words, reflected light transmitted through the transmitting area 21a or receiving area 21b is incident on the second prism 52, made total internal reflection once, and separated by transmitting through the wavelength separation surface 54a. However, reflected light, which is the laser light, incapable of transmitting the wavelength separation surface 54a and reflected from the wavelength separation surface 54a is blocked by the protection filter 60, so that it does not reach the measurer's eye.

Incidentally, conditional expressions explained with using the laser range finder 500 can be applied to the laser range finder 600. In the laser range finder 600, as for conditional expression (2), an angle of incidence of the light ray incident on and reflected from the first-optical-path-diverging surface, which is the receiving area 21b on the partial reflection surface 21, in other words, an angle of incidence of a light ray propagating on the optical path of the objective lens 30 reflected by the first-optical-path-diverging surface among light rays reflected from the target object becomes θ1. As for conditional expression (3), an angle of incidence of the measurement light incident on the second-optical-path-diverging surface, which is the wavelength separation surface 54a, in other words, an angle of incidence of the light ray emitted from the light source 10 transmitted through the second-optical-path-diverging surface and propagating on the optical axis of the objective lens 30 becomes θ2.

Seventh Embodiment

In the above-described hand-held, portable laser range finders 500 and 600, there has been a problem that since the image of the target object to be collimated blurs by a movement of the hands, the measurement position is difficult to be set. Then, a laser range finder 700 according to a seventh embodiment capable of suppressing image blur by means of moving at least a portion of the objective lens composing the laser range finder 500 shown in FIG. 6 as a vibration reduction lens in a direction having a component perpendicular to the optical axis is explained. Incidentally, the same component as the laser range finder 500 is attached to the same reference symbol to eliminate detailed explanations.

The laser range finder 700 according to the seventh embodiment shown in FIG. 8 is a one, in which the objective lens 30 of the laser range finder 500 shown in FIG. 6 is replaced by an objective lens 730 suitable for carrying out vibration reduction. In other words, the objective lens 730 is composed of, in order from an object side, a first lens group G1 having positive refractive power and a second lens group G2 having negative refractive power, and vibration reduction is carried out by moving the second lens group G2 in a direction having a component perpendicular to the optical axis. With putting the first lens group G1 disposed to the object side in possession of positive refractive power, the first lens group G1 can narrow the bundle of rays, so that the diameter of the second lens group G2 can be made small. Accordingly, the second lens group G2 becomes easy to be moved for vibration reduction. In this instance, with providing a gyro-sensor (angular velocity sensor) for detecting a movement of hands, the vibration reduction lens is moved in a direction canceling the detected movement.

Moreover, in the laser range finder 700 according to the seventh embodiment having such a construction, upon measuring a distance to a short-range object, with moving at least a portion of the objective lens 730 as a focusing lens along the optical axis, the short-range object is focused, so that the image of the object can be observed clearly. In the laser range finder 700 shown in FIG. 8, the second lens group G2 is made to be the focusing lens.

The whole of the objective lens 730 may be used as the vibration reduction lens and the focusing lens, or the objective lens 730 may be composed of three lens groups or more, and a portion thereof may be used as the vibration reduction lens or the focusing lens. In this case, vibration reduction and focusing may be carried out by different lens groups.

EXAMPLES

Examples on the basis of construction of the laser range finders 500 and 600 according to the fifth and sixth embodiments are explained.

Example 1

FIG. 6 is a diagram showing a configuration of a laser range finder 500 according to Example 1. In the laser range finder 500 shown in FIG. 6, there are disposed on an optical path from a measurement object to a photodetector 40, in order from the measurement object side, an objective lens 30 composed of a cemented lens constructed by a double convex lens cemented with a negative meniscus lens having a concave surface facing the object side, a partial reflection member 20 that is an optical member having a plane shape on which a partial reflection surface 21 is formed, a first prism 51 whose incident surface and exit surface are planes, a dichroic prism 54 constructed by cementing a second prism 52 and a third prism 53, forming a wavelength separation surface 54a on the cemented surface, and having a plane incident surface and a plane exit surface, and a background-light-blocking filter 41 having a plane shape.

In the following Table 1, various values and values for conditional expressions of the optical members disposed on the optical path between the measurement object and the photodetector 40 of the laser range finder 500 according to Example 1 are shown. In Table 1, f denotes a focal length. In the table of various values, the first column m denotes a lens surface number counted in order from the measurement object side along a direction in which the light beam travels, the second column r denotes a radius of curvature of each lens surface, the third column d denotes a distance along the optical axis from each lens surface to the next lens surface, and the fourth column nd and the fifth column vd denote a refractive index and an Abbe number at d-line, respectively. Incidentally, a radius of curvature r=0.000 shows a plane surface, and the refractive index of the air nd=1.00000 is omitted. Moreover, optical surfaces corresponding to surface numbers shown in Table 1 are shown in FIG. 6 with attaching "m". Here, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols shown in Table 1 is the same in the other Example.

TABLE 1 f = 112.0

| m | r | d | nd | vd |
|---|---|---|---|---|
| 1 | 73.370 | 5.0 | 1.51680 | 64.1 |
| 2 | −43.200 | 2.0 | 1.62004 | 36.3 |
| 3 | −142.755 | 61.3 | | |
| 4 | 0.000 | 2.0 | 1.51680 | 64.1 |
| 5 | 0.000 | 2.0 | 1.51680 | 64.1 |
| 6 | 0.000 | 2.0 | | |
| 7 | 0.000 | 33.9 | 1.51680 | 64.1 |
| 8 | 0.000 | 0.4 | | |
| 9 | 0.000 | 5.4 | 1.51680 | 64.1 |
| 10 | 0.000 | 3.1 | 1.51680 | 64.1 |
| 11 | 0.000 | 7.6 | | |
| 12 | 0.000 | 3.0 | 1.51680 | 64.1 |
| 13 | 0.000 | 5.3 | | |
| 14 | 0.000 | | | |

(1) $(\Sigma(di/ni))/f = 0.265$
(2) $\theta 1 = 30°$
(3) $\theta 2 = 24°$

In this manner, it is understood that the laser range finder 500 according to Example 1 satisfies all of the conditional expressions (1) through (3). The first-optical-path-diverging surface 21a is the surface number 5, the second-optical-path-diverging surface 54a is the surface number 10, and the photodetector 40, is the surface number 14.

Example 2

FIG. 7 is a diagram showing a configuration of a laser range finder 600 according to Example 2. In the laser range finder 600 shown in FIG. 7, there are disposed on an optical path from a measurement object to a light source 10, in order from a measurement object side, an objective lens 30 composed of a cemented lens constructed by a double convex lens cemented with a negative meniscus lens having a concave surface facing the object side, a partial reflection member 20 that is an optical member having a plane shape on which a partial reflection surface (receiving area 21*b*) is formed, a dichroic prism 54 constructed by cementing a second prism 52 and a third prism 53, forming a wavelength separation surface 54*a* on the cemented surface, and having a plane incident surface and a plane exit surface, and a condenser lens 11 composed of a positive meniscus lens having a convex surface facing the measurement object side. In the following Table 2, various values and values for conditional expressions of the optical members disposed on the optical path between the measurement object and the light source 10 of the laser range finder 600 according to Example 2 are shown.

TABLE 2 f = 112.0

| m | r | d | nd | νd |
|---|---|---|---|---|
| 1 | 73.370 | 5.0 | 1.51680 | 64.1 |
| 2 | −43.200 | 2.0 | 1.62004 | 36.3 |
| 3 | −142.755 | 57.4 | | |
| 4 | 0.000 | 4.0 | 1.51680 | 64.1 |
| 5 | 0.000 | 6.0 | 1.51680 | 64.1 |
| 6 | 0.000 | 2.0 | | |
| 7 | 0.000 | 6.5 | 1.51680 | 64.1 |
| 8 | 0.000 | 8.1 | 1.51680 | 64.1 |
| 9 | 0.000 | 5.4 | 1.51680 | 64.1 |
| 10 | 0.000 | 3.0 | | |
| 11 | 8.000 | 2.0 | 1.75520 | 27.6 |
| 12 | 15.800 | 9.6 | | |
| 13 | 0.000 | | | |

(1) $(\Sigma(di/ni))/f = 0.139$
(2) $\theta 1 = 30°$
(3) $\theta 2 = 24°$

In this manner, it is understood that the laser range finder 600 according to Example 2 satisfies all of the conditional expressions (1) through (3). Incidentally, the first-optical-path-diverging surface 21*a* is the surface number 5, the second-optical-path-diverging surface 54*a* is the surface number 9, and the light source 10 is the surface number 13.

What is claimed is:

1. A distance measuring apparatus comprising:
    a collimating optical system composed of, in order from a target object side, an objective lens, a partial reflection member and an erecting prism;
    a first-optical-path-diverging surface that is disposed in the partial reflection member and diverges a first measurement optical path from an optical path of the collimating optical system;
    a second-optical-path-diverging surface that is one reflection surface of the erecting prism and diverges a second measurement optical path from the optical path of the collimating optical system;
    a light source that is disposed on one of the first measurement optical path or the second measurement optical path and emits light for projecting onto the target object through said objective lens; and
    a photodetector that is disposed on the other of the first measurement optical path or the second measurement optical path and detects light that is reflected from the target object and converged by the objective lens; and
    the following conditional expression being satisfied:

$$0.05 \leq (\Sigma(di/ni))/f \leq 0.5$$

where di denotes a distance along the optical axis from each optical surface that includes the first-optical-path-diverging surface and is disposed between the first-optical-path-diverging surface and the second-optical-path-diverging surface to the image side next optical surface, ni denotes a refractive index of the medium disposed image side of each optical surface, and f denotes a focal length of the objective lens.

2. The distance measuring apparatus according to claim 1, wherein the first-optical-path-diverging surface includes a reflecting area that reflects the light and transmits visible light and a transmitting area that transmits visible light and the light.

3. The distance measuring apparatus according to claim 1, wherein the second-optical-path-diverging surface transmits the light and reflects visible light.

4. The distance measuring apparatus according to claim 1, wherein the following conditional expression is satisfied:

$$20° \leq \theta 1 \leq 40°$$

where $\theta 1$ denotes an angle of incidence of the light incident on the first-optical-path-diverging surface.

5. The distance measuring apparatus according to claim 1, wherein the following conditional expression is satisfied:

$$15° \leq \theta 2 \leq 40°$$

where $\theta 2$ denotes an angle of incidence of the light incident on the second-optical-path-diverging surface.

6. The distance measuring apparatus according to claim 1, wherein the collimating optical system includes an eyepiece that makes it possible to observe an image formed by the objective lens.

7. The distance measuring apparatus according to claim 1, wherein at least a portion of the objective lens is movable in a direction including a component perpendicular to the optical axis of the collimating optical system.

8. The distance measuring apparatus according to claim 1, wherein at least a portion of the objective lens is movable along the optical axis of the collimating optical system upon focusing.

* * * * *